US008554199B2

(12) United States Patent
Park (10) Patent No.: US 8,554,199 B2
(45) Date of Patent: Oct. 8, 2013

(54) SYSTEM AND METHOD FOR RELEASING RRC CONNECTION IN WIRELESS COMMUNICATION NETWORK (75) Inventor: Choong-Wan Park, Gyeonggi-Do (KR)

(73) Assignee: KT Corporation, Gyeonggi-do (KR)

( * ) Notice: Subject to any disclaimer, the term of this patent is extended or adjusted under 35 U.S.C. 154(b) by 0 days.

(21) Appl. No.: 13/371,555

(22) Filed: Feb. 13, 2012

(65) Prior Publication Data

US 2012/0208527 A1 Aug. 16, 2012

(30) Foreign Application Priority Data

Feb. 11, 2011 (KR) ........................ 10-2011-0012417

(51) Int. Cl.
*H04W 88/02* (2009.01)
(52) U.S. Cl.
USPC ........................................................ 455/423
(58) Field of Classification Search
USPC ........... 455/423; 370/311, 328, 331, 332, 390
See application file for complete search history.

(56) References Cited

U.S. PATENT DOCUMENTS

| 8,305,997 | B2* | 11/2012 | Virkki et al. | 370/332 |
| 2010/0234014 | A1* | 9/2010 | Virkki et al. | 455/423 |
| 2011/0222450 | A1* | 9/2011 | Youssef et al. | 370/311 |
| 2012/0020393 | A1* | 1/2012 | Patil et al. | 375/222 |

FOREIGN PATENT DOCUMENTS

| KR | 10-0726656 B1 | 6/2007 |
| KR | 10-0846282 B1 | 7/2008 |
| KR | 10-2009-0109348 A | 10/2009 |

* cited by examiner

*Primary Examiner* — Diane Mizrahi
(74) *Attorney, Agent, or Firm* — IP Legal Services, LLC (57) ABSTRACT

Provided are systems and methods for releasing a radio resource control (RRC) connection between a user equipment and a radio network controller. The system may include a user equipment and a radio network controller. The user equipment may be configured to transmit a RRC connection release indication when a timer expires in a connected mode and release the RRC connection upon receiving a RRC connection release message. The radio network controller may be configured to receive the RRC connection release indication from the user equipment and transmit the RRC connection release message in response to the RRC connection release indication.

17 Claims, 6 Drawing Sheets

SYSTEM AND METHOD FOR RELEASING RRC CONNECTION IN WIRELESS COMMUNICATION NETWORK

CROSS REFERENCE TO PRIOR APPLICATIONS

The present application claims priority under 35 U.S.C. §119 to Korean Patent Application No. 10-2011-0012417 (filed on Feb. 11, 2011), which is hereby incorporated by reference in its entirety.

FIELD OF THE INVENTION

The present invention relates to wireless communications and, in particular, a radio resource control (RRC) connection and associated messages.

BACKGROUND OF THE INVENTION

Lately, wireless communication technology has exhibited dramatic and rapid development. Such dramatic development of wireless communication technology has advanced user equipment functionality. Advanced user equipment, such as a smart phone, enables a user to do many complicated daily tasks conveniently and efficiently. For example, through the advanced user equipment, a user can communicate with other parties, exchange messages with other parties, do web-surfing, navigate a route, listen to music, and/or watch video and movies through a streaming service. The advanced user equipment, however, disadvantageously increases an amount of data traffic and consumes a large amount of radio resources in a communication network. Since radios resources are limited in a communication network, so there has been a demand for developing methods for effectively utilizing limited radio resources in a communication network.

In order to effectively utilize limited radio resources, a radio resource control (RRC) protocol has been introduced. In the RRC protocol, a RRC connection may be established between user equipment and a radio network controller (RNC), and radio resources such as channels between the user equipment and a RNC are managed based on an amount of data traffic and a required power consumption level. For example, when the user equipment has data to transmit and receive, a RRC connection is established between the user equipment and the RNC. In the RRC protocol, the RRC connection is established in a connected mode and the RRC connection may be managed based on an amount of data traffic. For example, at least one of a dedicated channel, a shared channel, and a paging channel may be allocated to the user equipment according to a data traffic amount. The dedicated channel may be allocated when the data traffic amount is greater than a certain data traffic amount. The shared channel or the paging channel may be allocated when a traffic amount is comparatively smaller than a certain data traffic amount. When there is no data to be transmitted or received for a given time, the connected mode transitions to an idle mode. In the idle mode, the RRC connection is released. By releasing the RRC connection, occupied radio resources may become available again for other user equipment. In this manner, limited radio resources in a communication network may be shared with other entities in a corresponding communication network. Therefore, releasing a RRC connection may be very important to effectively utilize radio resources in a communication network.

In order to release a RRC connection, a typical RRC connection release procedure requires exchanging a paging message and a paging response message between the user equipment and a radio network controller through a communication network. The exchange of the paging message and the paging response message may cause network load in a related communication network.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, a radio resource control (RRC) connection may be released with network load minimized.

In accordance with another aspect of the present invention, a RRC connection may be released without exchanging a paging message and a paging response message between user equipment and a radio network controller.

In accordance with still another aspect of the present invention, a radio network controller may set up a timer based on a communication environment and a data traffic pattern of user equipment, and the user equipment may initiate the RRC connection release procedure when the timer expires.

In accordance with an exemplary embodiment of the present invention, a system may be provided for releasing a radio resource control (RRC) connection. The system may include user equipment and a radio network controller. The user equipment may be configured to transmit a RRC connection release indication when a timer expires in a connected mode and release the RRC connection upon receiving a RRC connection release message. The radio network controller may be configured to receive the RRC connection release indication from the user equipment and transmit the RRC connection release message in response to the RRC connection release indication.

The user equipment may be further configured to initiate a Cell update procedure when the timer expires and to transmit a Cell update message having the RRC connection release indication to the radio network controller.

The user equipment may transmit the Cell update message based on a cause event, the cause event at least one of cell reselection, periodical cell update, uplink data transmission, paging response, reentered service area, radio link failure, RLC unrecoverable error, and RRC connection release indication. A Cell update cause event may include the RRC connection release indication.

The user equipment may transmit the RRC connection release indication when the timer expires within a corresponding one of a Cell_paging channel (Cell_PCH) state and a UTRAN registration area_paging channel (URA_PCH) state.

The radio network controller may be configured to set up a value of the timer and transmit the value of the timer to the user equipment. To set up the value of the timer, the radio network controller may employ a communication environment and data traffic pattern of the user equipment.

The radio network controller may include within a system information block (SIB) parameter the value of the timer and transmit the SIB parameter to the user equipment.

The user equipment may be configured to receive the SIB parameter from the radio network controller, to set a timer of the user equipment based the value of the timer of the SIB parameter, and to initiate the RRC connection release procedure when the timer expires.

A value of the timer of the user equipment may indicate a time for the user equipment to transition from i) one of a Cell_paging channel (Cell_PCH) state and a UTRAN registration area_paging channel (URA_PCH) state to ii) the idle mode.

The radio network controller may include a parameter setup unit. The parameter setup unit may be configured to set up a system information block (SIB) parameter to include a value of the timer and transmit the SIB parameter to the user equipment.

In accordance with another embodiment of the present invention, a method may be provided for releasing a radio resource control (RRC) connection. The method may include transmitting, by user equipment, a RRC connection release indication to a radio network controller when a timer expires in a connected mode, releasing the RRC connection to the radio network controller upon receiving a RRC connection release message from the radio network controller, and transitioning from the connected mode to an idle mode.

The transmitting the RRC connection release indication may include initiating a Cell update procedure when the timer expires, and transmitting a Cell update The user equipment may transmit the Cell update message based on a cause event, the cause event at least one of cell reselection, periodical cell update, uplink data transmission, paging response, reentered service area, radio link failure, RLC unrecoverable error, and the RRC connection release indication. For example, a Cell update cause event may include the RRC connection release indication.

The RRC connection release indication ma be transmitted when the timer expires within a corresponding one of a Cell_paging channel (Cell_PCH) state and a UTRAN registration area_paging channel (URA_PCH) state.

In accordance with another exemplary embodiment of the present invention, a method for releasing a radio resource control (RRC) connection. The method may include receiving a Cell update message including a RRC connection release indication from user equipment, initiating a RRC connection release procedure for releasing the RRC connection between the user equipment and the radio network controller, and transmitting a RRC connection release message to the user equipment in response to the Cell update message.

Prior to the receiving the Cell update message, the method may include setting a timer value based on a communication environment and a data traffic pattern of the user equipment, and transmitting the timer value to the user equipment. The user equipment may set up a timer based on the timer value and transmit the Cell update message including the RRC connection release indication when the timer expires.

The setting the timer value may include setting a system information block (SIB) parameter so as to include the timer value, and transmitting the SIB parameter to the user equipment.

The timer value may indicate a time for the user equipment to transition from i) one of a Cell_paging channel (Cell_PCH) state and a UTRAN registration area_paging channel (URA_PCH) state to ii) the idle mode.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Reference will now be made in detail to embodiments of the present invention, examples of which are illustrated in the accompanying drawings, wherein like reference numerals refer to like elements throughout. The embodiments are described below, in order to explain the present invention by referring to the figures.

For convenience and ease of understanding, system and method for releasing a radio resource control (RRC) connection in accordance with an exemplary embodiment of the present invention will be described as releasing a RRC connection in a $3^{rd}$ generation partnership project universal mobile telecommunication system (3GPP UMTS) network. The present invention, however, is not limited thereto. For example, the present invention may be applied to a global system for mobile communication (GSM) or a long term evolution (LTE) advanced network.

In accordance with an exemplary embodiment of the present invention, a radio resource control (RRC) connection may be released without exchanging a paging message and a paging response message between user equipment and a radio network controller. Particularly, user equipment may initiate a RRC connection release procedure by transmitting a RRC connection release indication to a radio network controller when no data is generated for a given time in a URA_PCH state or a Cell_PCH state (as such states are defined in the art of a 3GPP network operating in accordance with one or more associated standards). Hereinafter, system and method for releasing a RRC connection in a wireless communication network in accordance with an embodiment of the present invention will be described with reference to the accompanying drawings.

Figure 1:
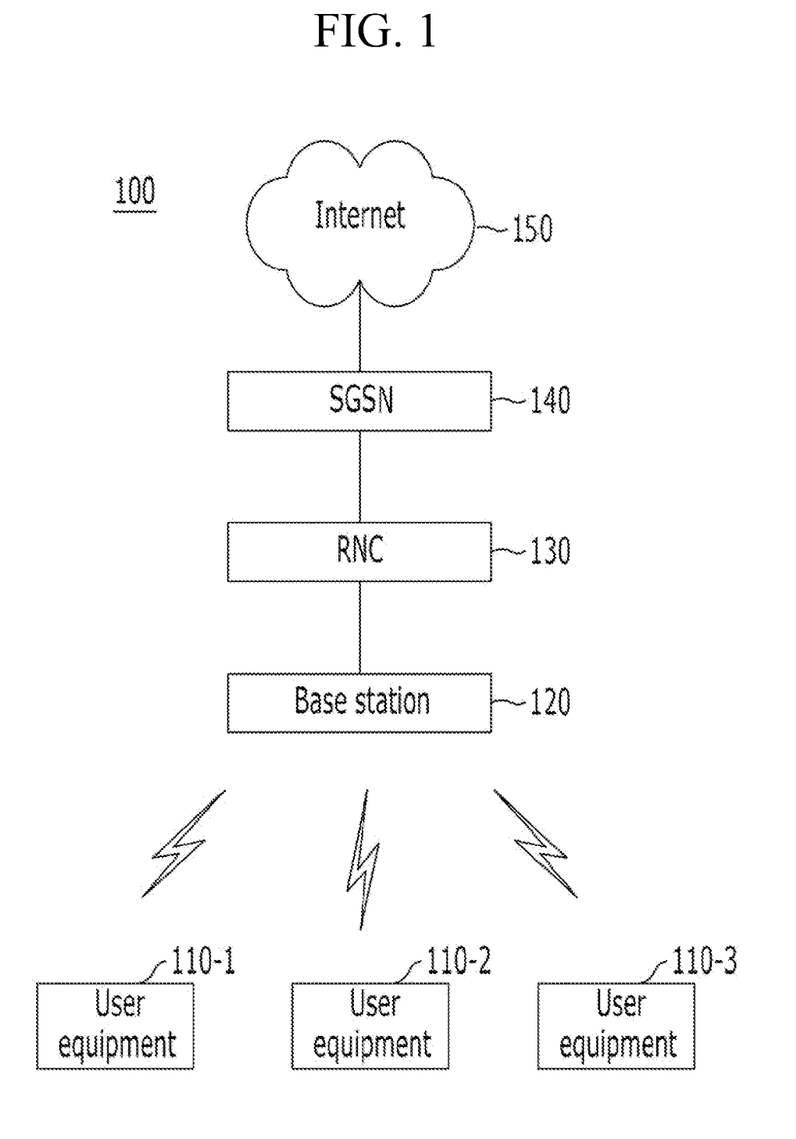
FIG. 1 illustrates a system for releasing a RRC connection in a wireless communication network in accordance with an exemplary embodiment of the present invention.

FIG. 1 illustrates a system for releasing a RRC connection in a wireless communication network in accordance with an exemplary embodiment of the present invention.

Referring to FIG. 1, a system 100 may include several user equipment 110-1, 110-2, and 110-3, base station 120, radio network controller (RNC) 130, and serving general packet radio service (GPRS) support node (i.e., "SGSN") 140.

User equipment 110-1, 110-2, and 110-3 may be connected to RNC 130 through base station 120. Radio connections may be established between user equipment 110-1, 110-2, and 110-3 and RNC 130 in order to transmit and/or receive data. In order to efficiently manage radio resources in a communication network, the radio connections may be managed based on a RRC connection state defined in a RRC connection protocol. For example, a RRC connection may be established in a connected mode. In connected mode, the RRC connection may be managed according to RRC states such as a Cell_dedicated channel (Cell-DCH) state, a Cell_forward access channel (Cell_FACH) state, a Cell_paging channel (Cell_PCH), and a UTRAN registration area_paging channel (URA_PCH) state. The RRC connection may be released in an idle mode. User equipments 110-1, 110-2, and 110-3 may be allocated with a dedicated channel or a shared channel according to the RRC states. Accordingly, user equipments 110-1 to 110-3 may be restricted for uplink data transmission according to the RRC states.

When no data traffic is generated for a given time in a URA_PCH state or a Cell_PCH state, a RRC connection between user equipments 110-1 to 110-3 and RNC 130 may be released. In accordance with an embodiment of the present invention, user equipment 110-1 to 110-3 may receive a system information block (SIB) parameter including a timer value (T) from RNC 130. The timer value (T) may indicate a time period for transitioning from the URA_PCH state or the Cell_PCH to an idle mode. User equipment 110-1 to 110-3 may set up a timer based on the timer value (T) of the SIB parameter and initiate a RRC connection release procedure when the timer expires.

Particularly, user equipment 110-1 to 110-3 may transmit a RRC connection release indication to RNC 130 when the timer expires. In order to transmit the RRC connection release indication, user equipments 110-1 to 110-3 may use a Cell update message. For example, when data traffic is not generated until a timer expires in the URA_PCH state or the Cell_PCH state, a Cell update procedure may be initiated. As the Cell update procedure is initiated, user equipment 110-1 to 110-3 may transmit a Cell update message with the RRC connection release indication to RNC 130. In response to the Cell update message, user equipment 110-1 to 110-3 may receive a RRC connection release message from RNC 130. User equipment 110-1 to 110-3 may release the RRC connection to RNC 130 and transitions to the idle mode.

RNC 130 may be connected with at least one of user equipment 110-1 to 110-3 through base station 120. RNC 130 may perform allocation, modification, and release of radio resources in a radio communication network. Furthermore, RNC 130 may perform mobility management of user equipment 110-1 to 110-3. For example, RNC 130 may manage mobility of user equipment 110-1 to 110-3 based on a RRC protocol. For example, RNC 130 may manage RRC connection to user equipment 110-1 to 110-3.

In accordance with an exemplary embodiment of the present invention, RNC 130 may receive a Cell update message having a RRC release indication from user equipment 110-1 to 110-3. After receiving the RRC release indication from user equipment 110-1 to 110-3, RNC 130 may initiate a RRC connection release procedure. For example, RNC 130 may transmit an Iu release request message to SGSN 130 and receive an Iu release command message from SGSN 130. Upon the receipt of the Iu release command message, RNC 130 may transmit a RRC connection release message to user equipments 110-1 to 110-3. After transmitting the RRC connection release message, RNC 130 may transmit an Iu release complete message to SGSN 130.

In accordance with an exemplary embodiment of the present invention, RNC 130 may set up a time period to define how long user equipment 110-1 to 110-3 waits before transmitting the RRC connection release indication to RNC 130 when data traffic is not generated in the URA_PCH state or the Cell_PCH state. This time period may be defined by creating a new parameter or modifying an existing parameter in a system information block (SIB). Accordingly, RNC 130 may set up a timer value (T) by defining or modifying parameters in the SIB and transmit the defined or modified SIB parameter to user equipment 110-1 to 110-3. RNC 130 may consider communication environments and traffic patterns of user equipment 110-1 to 110-3 to set up the timer value (T).

After setting up, RNC 130 may transmit the SIB parameter having the timer value (T) to user equipment 110-1 to 110-3.

SGSC 140 may perform a role as a packet switching device in a communication network. SGSC 140 may perform packet routing, packet transmission, and mobility management such as attach/detach process and local management, logical link management and authentication for user equipment 110-1, 110-2, and 110-3.

Furthermore, SGSC 140 may receive an Iu release request message from RNC 130 and transmit an Iu release command message to RNC 130 for the RRC connection release procedure. In response to the Iu release command message, SGSC 140 may receive an Iu release complete message from RNC 130.

As described above, a RRC connection may be released without exchanging a paging message and a paging response message between user equipment 110-1 to 1103 and RNC 130 in accordance with an exemplary embodiment of the present invention. In addition, RNC 130 may set up the timer value (T) for transitioning from the URA_PCH state or the Cell_PCH state to the idle mode based on communication environments and traffic patterns of user equipment 110-1 to 110-3 in accordance with an exemplary embodiment of the present invention. Accordingly, the RRC connection release procedure may be dynamically controlled based on a status of a communication network in accordance with an exemplary embodiment of the present invention. Moreover, user equipments 110-1 to 110-3 may trigger the RRC connection release procedure by transmitting a RRC release indication to RNC 130 in accordance with an exemplary embodiment of the present invention.

Hereinafter, RRC states in a connected mode and state transitions, which are defined in a RRC protocol, will be described with reference to FIG. 2.

Figure 2:
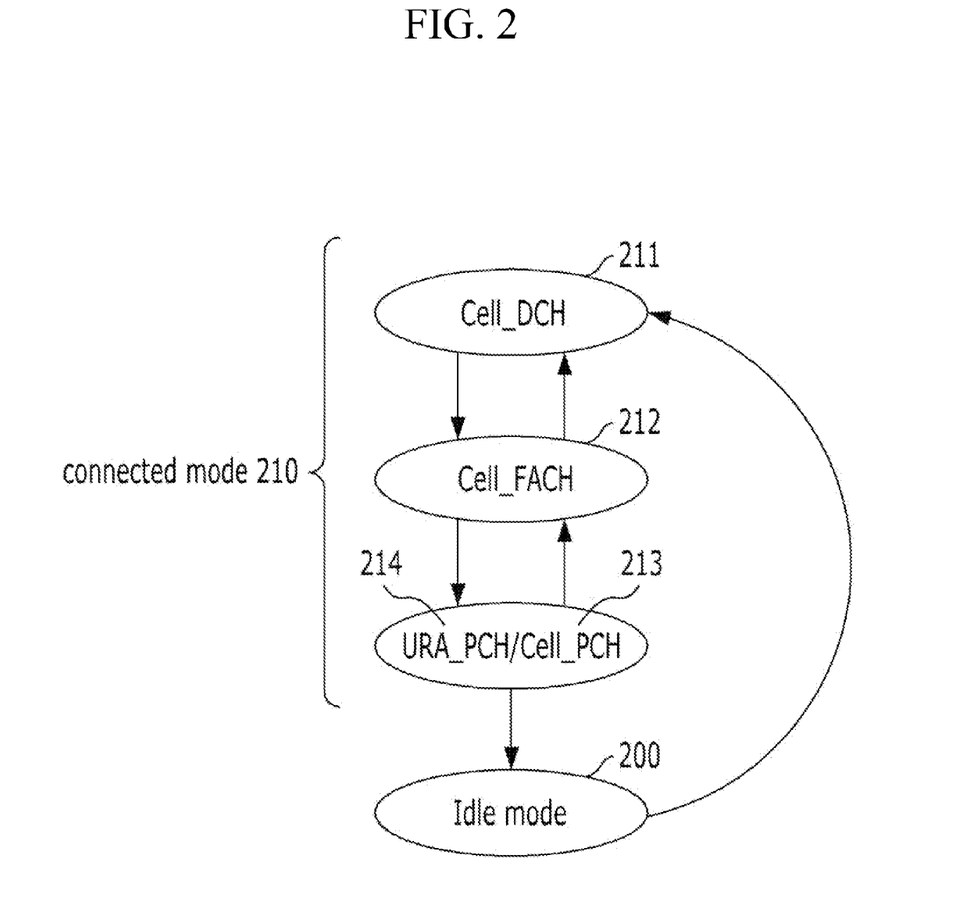
FIG. 2 illustrates RRC states and state transitions.

FIG. 2 illustrates RRC states and state transitions.

Referring to FIG. 2, the RRC protocol may define two modes: connected mode 210 and idle mode 200. A RRC connection may not be established or an existing RRC connection may be released in idle mode 200. On the contrary, a RRC connection may be established in connected mode 210 and managed according to RRC states. The RRC states may include Cell_dedicated channel (Cell-DCH) state 211, Cell_forward access channel (Cell_FACH) state 212, Cell_paging channel (Cell_PCH) 213, and UTRAN registration area_paging channel (URA_PCH) state 214.

When data traffic is generated in IDLE mode 200, IDLE mode 200 transitions to CELL_DCH state 211 of connected mode 210. In CELL_DCH state 211, a dedicated physical channel may be allocated to user equipment in uplink and downlink. Accordingly, the user equipment may transmit and receive data at a comparatively fast speed through the allocated dedicated physical channel in CELL_DCH state 211. The user equipment, however, may consume a large amount of radio resources in CELL_DCH state 211 because the dedicated physical channels are always allocated to the user equipment.

When data traffic is not generated for a certain period in CELL_DCH state 211 or when an amount of generated data traffic is smaller than a given threshold in CELL_DCH state 211, CELL_DCH state 211 may transition to CELL_FACH state 212. In CELL_FACH state 212, the user equipment may not be allocated with a dedicated physical channel in uplink and downlink The user equipment may be allowed to only use a common or shared channel. Accordingly, the user equipment may be enabled to exchange a small amount of uplink/downlink data in CELL_FACH state 212. Since only a common or shared channel is used in CELL_FACH state 212, the user equipment may not consume a large amount of radio resource as compared to CELL_DCH state 211. A data transmitting/receiving speed of CELL_FACH state 212 may be slower than that of CELL_DCH state 211. When a large amount of data traffic is generated in CELL_FACH state 212, CELL_FACH state 212 may transition back to CELL_DCH state 211 because a comparatively fast data transmitting/receiving speed is required.

When data traffic is not generated for a certain period in CELL_FACH state 212, CELL_FACH state 212 may transition to at least one of CELL_PCH 213 and URA_PCH 214. In CELL_PCH state 213 and URA_PCH state 214, no uplink activities may not be allowed in CELL_PCH state 213 and URA_PCH state 214. The user equipment may be only allowed to downlink data. For example, the user equipment may receive a paging message from a radio network controller through a paging channel. Accordingly, the user equipment monitors a paging channel at a discontinuous reception cycle (CRX) in CELL_PCH state 213 or URA_PCH state 214. Since no resources are granted for data transmission in CELL_PCH state 213 or URA_PCH state 214, a transition to another state may be required for data transmission. For example, it may require transition from URA_PCH state 214 to Cell_FACH state 212 for data transmission.

When a downlink data traffic to the user equipment is generated in CELL_PCH state 213 or URA_PCH 214, the user equipment may be waked up using a paging channel. Then, CELL_PCH state 213 or URA_PCH state 214 may transit to CELL_FACH state 212 or CELL_DCH 211. When data traffic is not generated for a given period in Cell_PCH state 213 or URA_PCH state 214, a RRC connection release procedure may be initiated and the RRC connection may be released. Then, CELL_PCH state 213 or URA_PCH state 214 may transition to idle mode 200. The user equipment may monitor a paging indicator channel (PICH) in idle mode 200.

In order to initiate a RRC connection release procedure, a RRC connection release message may be transmitted to the user equipment. Since the user equipment is in Cell_PCH state 213 or URA_PCH state 214, the user equipment may be required to be waked up. For waking up, a paging message may be required to be transmitted to the user equipment. Such a paging message may significantly increase network load because a radon network controlled needs to wait for a paging response message in consideration of a DRX cycle of the user equipment after transmitting the paging message. Hereinafter, such a typical RRC connection release procedure will be described in detail with reference to FIG. 3.

Figure 3:
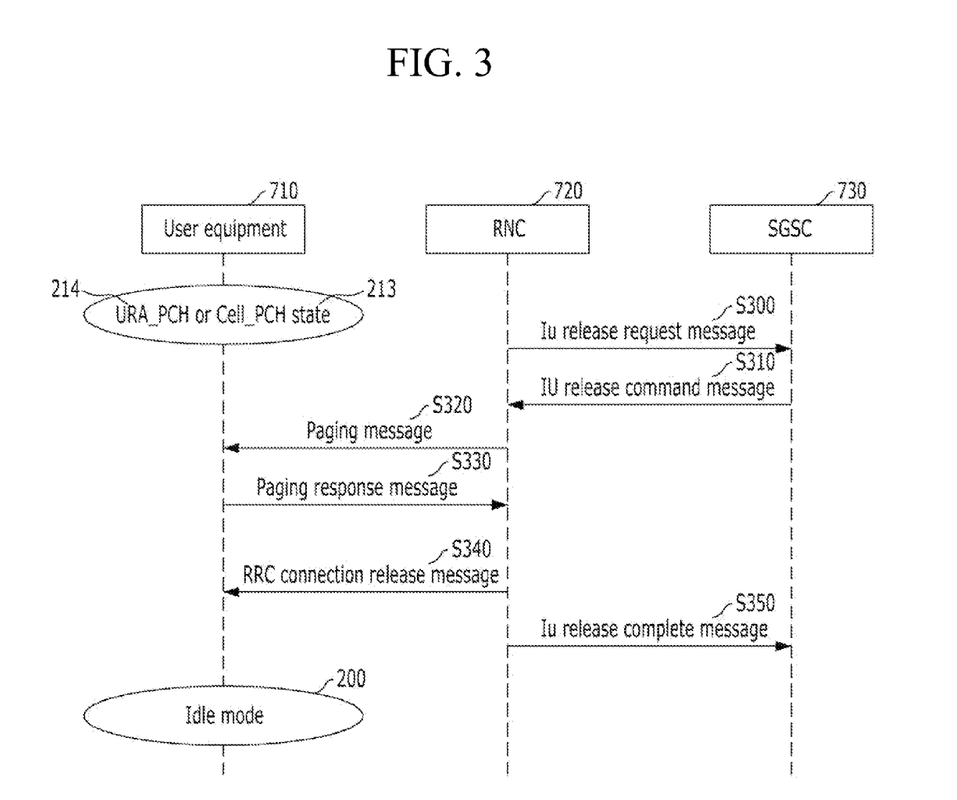
FIG. 3 illustrates a typical method for releasing a RRC connection when Cell_PCH state or URA_PCH state transitions to idle mode.

FIG. 3 illustrates a typical method for releasing a RRC connection when Cell_PCH state or URA_PCH state transitions to idle mode.

Referring to FIG. 3, when traffic has not been generated for a given time in a CELL_PCH state or a URA_PCH state, a RRC connection release procedure may be initiated. After the RRC connection release procedure, the CELL_PCH state or the URA_PCH state may transition to an idle mode. In order to initiate a RRC connection release procedure, RNC 720 may transmit an Iu release request message to SGSN 730 to release an Iu connection to user equipment 710 at step S300. In response to the Iu release request message, SGSC 730 may transmit an Iu release command message to RNC 720 at step S310.

When RNC 720 receives the Iu release command message from SGSC 730, RNC 720 may transmit a paging message to user equipment 710 in a URA_PCH state or a Cell_PCH state at step S320. In response to the paging message, user equipment 710 may transmit a paging response message to RNC 720 at step S330. In order to transmit the paging response message, a RRC state may transition from the URA_PCH state to a CELL_FACH state and user equipment 710 may transmit the paging response message through a Cell update message.

In response to the paging response message, RNC 720 may transmit a RRC connection release message to user equipment 710 at step S340. Upon receipt of the RRC connection release message, a RRC connection release procedure may be initiated. After the RRC connection release procedure, RNC 720 may transmit an Iu release complete message to SGSN 730 at step 350. The RRC connection between user equipment 710 and RNC 720 may be released and the RRC connection state may transition to idle mode.

As described above, RNC 720 may transmit the paging message to user equipment 710 to initiate the RRC connection release procedure. The transmission of the paging message may increase network load because RNC 720 may wait for the paging response message in consideration of a discontinuous reception cycle (DRX) of user equipment 720 after transmitting the paging message to user equipment 710. Accordingly, there is a need for developing a method for preventing network load created by transmission of a paging message when URA_PCH state or Cell_PCH state transitions to idle mode.

In accordance with an exemplary embodiment of the present invention, user equipment may request a RRC connection release to a RNC using a Cell update procedure in a URA_PCH state or a Cell_PCH state unlike the typical RRC connection release procedure. In this manner, the RNC may not need to transmit a paging message and receive a paging response message. Accordingly, network load, which is created by exchanging the paging message and the paging response message, may be prevented in accordance with an exemplary embodiment of the present invention. Hereinafter, a method is described for releasing a RRC connection in a URA_PCH state or a Cell_PCH state without a paging message and without a paging response message in accordance with an exemplary embodiment of the present invention.

Figure 4:
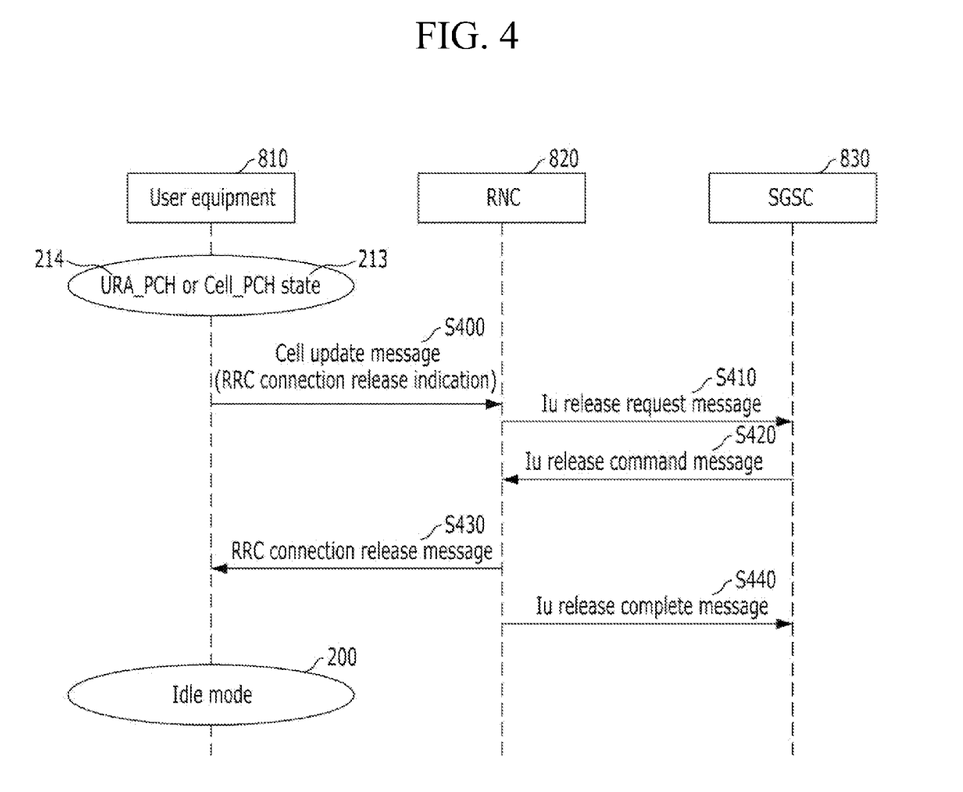
FIG. 4 illustrates a method for releasing a RRC connection in a URA_PCH state or a Cell_PCH state in accordance with an exemplary embodiment of the present invention.

FIG. 4 illustrates a method for releasing a RRC connection in a URA_PCH state or in a Cell_PCH state in accordance with an exemplary embodiment of the present invention.

Referring to FIG. 4, when data traffic is not generated for a given time in a URA_PCH state or a Cell_PCH state, user equipment 810 may transmit a Cell update message (RRC connection release indication) to RNC 820 at step S400. The RRC connection release indication may be transmitted through a Cell update message. For example, when data traffic is not generated until a given timer expires in the URA_PCH state 214 or in the Cell_PCH state 213, a Cell update procedure may be initiated. Such a given timer may be provided from RNC 820. The given timer will be described later with reference to FIG. 5.

As the Cell update procedure is initiated, a Cell update message may be transmitted to RNC 820 at step S400. The RRC connection release indication may be transmitted to RNC 820 with the Cell update message. In order to initiate the Cell update procedure, information element functional "Cell update cause" may be defined to include RRC connection release indication in accordance with an exemplary embodiment of the present invention. For example, Table 1 shows the information element functional "Cell update cause," defined in $3^{rd}$ generation partnership project (3GPP) specification such as 3GPP TS 25.331. As shown in Table 1, the information element functional "Cell update cause" or other form of cause event may include a RRC connection release indication in accordance with an exemplary embodiment of the present invention.

TABLE 1

| Information Element/ Group Name | Type and reference |
|---|---|
| Cell update cause event | Enumerated (cell reselection, periodical cell update, uplink data transmission, paging response, reentered service area, radio link failure, RLC unrecoverable error, RRC connection release indication) |

As shown in Table 1, the Cell update procedure may be initiated by the RRC connection release indication as well as cell reselection, periodical cell update, uplink data transmission, paging response, reentered service area, radio link failure, and RLC unrecoverable error in accordance with an exemplary embodiment of the present invention.

In response to the Cell update message from user equipment 810, RNC 820 may transmit an Iu release request message to SGSC 830 at step S410. In response to the Iu release request message, SGSC 830 may transmit an Iu release command message to RNC 820 at step S420.

In response to the Iu release request message, RNC 820 may transmit a RRC connection release message to user equipment 810 at step S430. Upon the receipt of the RRC connection release message, user equipment 810 may perform a RRC connection release procedure. RNC 820 may transmit an Iu release completion message to SGSC at step S440. As a result of the RRC connection release procedure, the RRC connection between user equipment 810 and RNC 820 may be released. The URA_PCH state 214 or the Cell_PCH state 213 may transition to idle mode 200.

As described above, user equipment 810 may transmit the RRC connection release indication using the Cell update message without receiving a paging message from RNC 820 and transmitting a paging response message to RNC 820, in accordance with an exemplary embodiment of the present invention. Accordingly, network load may be not created by exchanging the paging message and the paging response message between user equipment 810 and RNC 820, and the number of RRC messages for releasing a RRC connection between user equipment 810 and RNC 820 may be reduced in accordance with an exemplary embodiment of the present invention.

As described above, a time period may be needed to define how long user equipment 810 waits before transmitting the RRC connection release indication to RNC 820 when data traffic is not generated in URA_PCH state 214 or the Cell_PCH state 213. This time period may be defined by creating a new parameter or modifying an existing parameter in a system information block (SIB). In accordance with an exemplary embodiment of the present invention, RNC 820 may set up a time value by defining or modifying parameters in the SIB and transmit the defined or modified SIB parameter to user equipment 810. Hereinafter, a method for releasing a RRC connection with setting up and transmitting a time value in accordance with an exemplary embodiment of the present invention will be described with reference to FIG. 5.

Figure 5:
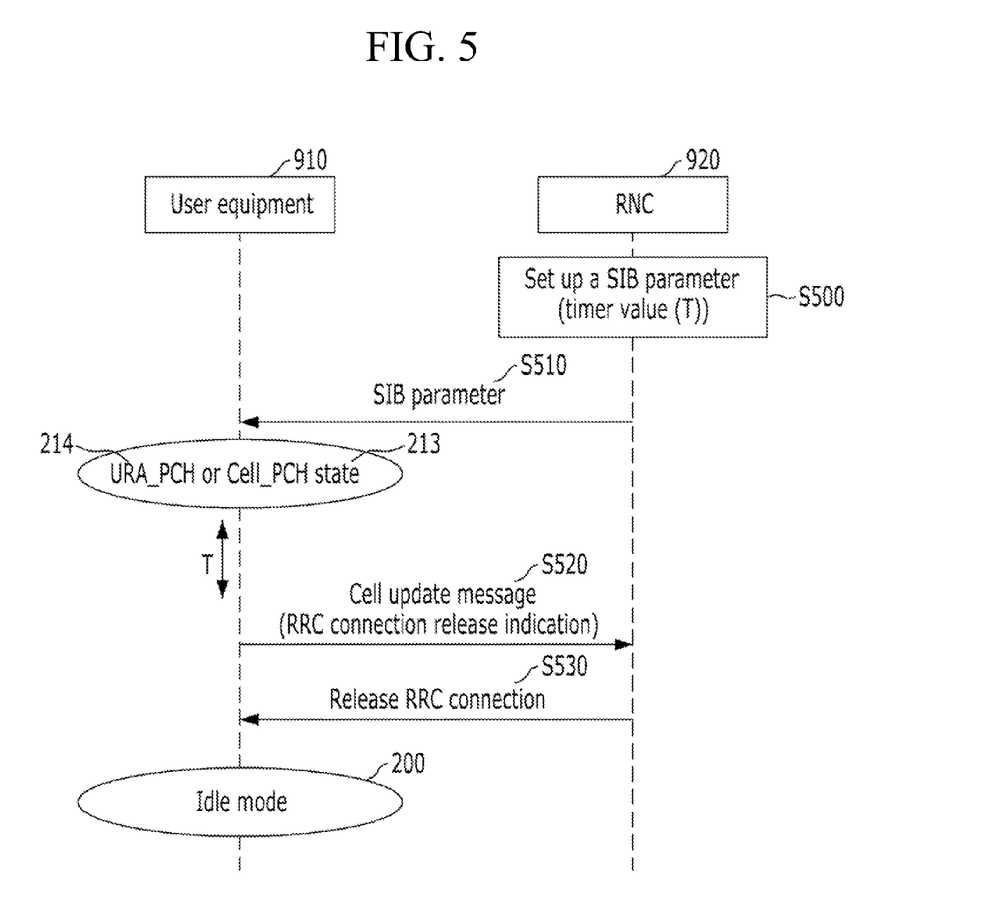
FIG. 5 illustrates a method for releasing a RRC connection in a URA_PCH state or a Cell_PCH state in accordance with an embodiment of the present invention.

FIG. 5 illustrates a method for releasing a RRC connection in URA_PCH state 214 or Cell_PCH state 213 in accordance with an embodiment of the present invention.

Referring to FIG. 5, RNC 920 may set a SIB parameter at step S500 and transmit the set SIP parameter to user equipment 910 at step S510. The SIB parameter may include a timer value (T) for transitioning from URA_PCH state 214 or Cell_PCH state 213 to idle mode 200. That is, the SIB parameter may include information on how long user equipment 910 waits before transmitting the RRC connection release indication to RNC 920 when data traffic is not generated in URA_PCH state 214 or Cell_PCH state 213.

Furthermore, RNC 920 may modify the timer value (T) and may transmit the modified timer value (T) to user equipment 910 as a form of SIB update message. RNC 920 may consider a traffic pattern and a communication environment to set or to modify the timer value (T). For example, RNC 920 may shorten the timer value (T) when an overall data traffic amount becomes greater than a given threshold in an area managed by RNC 920. RNC 920 may increase the timer value (T) when frequency of transmitting and receiving data in user equipment 910 increases. For example, when a user frequently uses a chatting application, RNC 920 may increase a timer value (T). When a user uses a chatting application, the frequency of transmitting and receiving data is higher as compared to the frequency of transmitting and receiving data traffic when a user does web-surfing.

User equipment 910 may set a timer within user equipment 910 based on the timer value (T) included in the received SIB parameter from RNC 920. When data traffic is not generated in URA_PCH state 214 or Cell_PCH state 213 until the timer expires, user equipment 910 may initiate a Cell update procedure and transmit a RRC connection release indication through a Cell update message to RNC 920 at step S520.

In response to the Cell update message, RNC 920 may transmit a RRC connection release message to user equipment 910 at step S530. Upon the receipt of the RRC connection release message, a RRC connection release procedure may be initiated and URA_PCH state 214 or Cell_PCH state 213 may transition to idle mode 200.

As described above, RNC 920 may set the time value (T) to define a period of how long user equipment 910 waits before transmitting the RRC connection release indication to RNC 920 when data traffic is not generated in URA_PCH state 214 or Cell_PCH state 213. RNC 920 may create a new parameter or modify an existing parameter in the SIB and transmit the SIB parameter to user equipment 910. Hereinafter, RNC 920 will be described with reference to FIG. 6.

Figure 6:
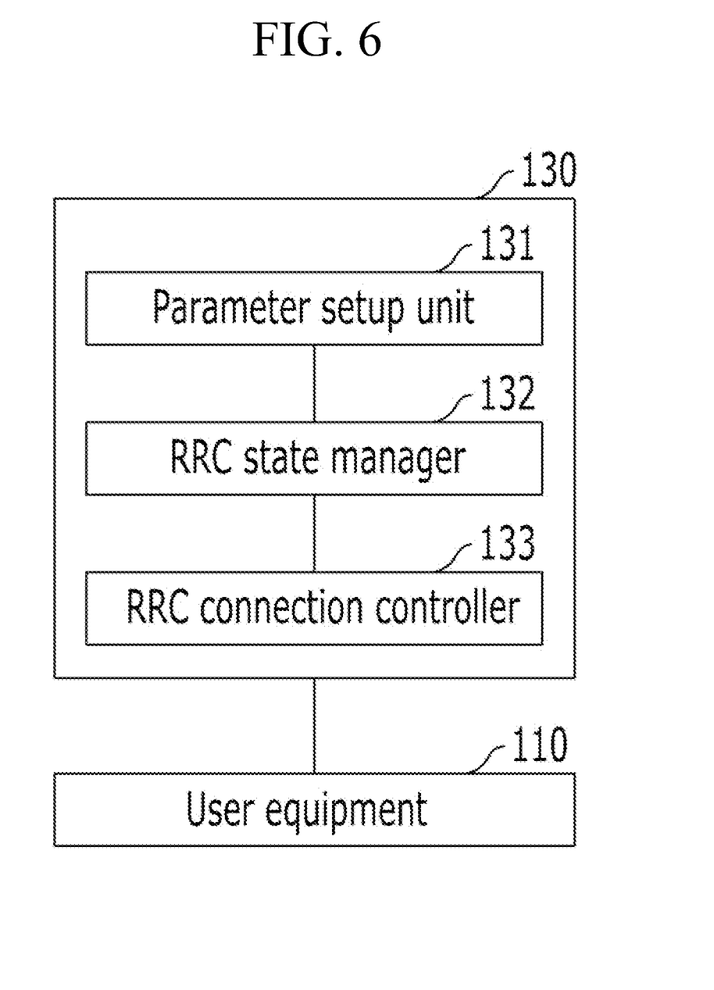
FIG. 6 illustrates a radio network controller (RNC) in accordance with an exemplary embodiment of the present invention.

FIG. 6 illustrates a radio network controller (RNC) in accordance with an exemplary embodiment of the present invention.

Referring to FIG. 6, RNC 130 may include parameter setup unit 131, RRC connection state manager 132, and RRC connection controller 133.

Parameter setup unit 131 may set a SIB parameter for RRC connection release indication. For example, parameter setup unit 131 may set a timer value (T) to define a period of how long user equipment 110 waits before transmitting the RRC connection release indication to RNC 130 when data traffic is not generated in URA_PCH state 214 or Cell_PCH state 213. Particularly, parameter setup unit 131 may create or modify a SIB parameter to include the time value (T). Parameter setup unit 131 may consider a traffic pattern and a communication environment to set or to modify the timer value (T). After setting the SIB parameter, the SIB parameter may be transmitted to user equipment 110.

RRC state manager 132 may manage transition of the RRC connection between RNC 130 and user equipment 110. For example, RRC state manager 132 may manage occupation and transitions between at least one of a CELL_DCH state, a CELL_FACH state, a URA_PCH state, and an IDLE state based on traffic amount.

RRC connection controller 133 may carry out a RRC connection release procedure for releasing a RRC connection between user equipment 110 and RNC 130 upon the receipt of the RRC connection release indication included in a Cell update message from user equipment 110.

As described above, a RRC connection may be released without exchanging a paging message and a paging response message between a user equipment and a radio network controller. Furthermore, the number of messages, exchanged between a user equipment and a radio network controller during transitioning from a URA_PCH state or a Cell_PCH state to an IDLE mode, may be reduced in accordance with an exemplary embodiment of the present invention. Accordingly, overall network load created for releasing a RRC connection may be reduced in accordance with an exemplary embodiment of the present invention.

In addition, the radio network controller may set up the time value (T) for transitioning from the URA_PCH state or the Cell_PCH state to the idle mode based on a communication environment and a traffic pattern of a user equipment in accordance with an exemplary embodiment of the present invention. Accordingly, the RRC connection release procedure may be dynamically controlled based on a status of a communication network in accordance with an exemplary embodiment of the present invention.

Moreover, user equipment may trigger the RRC connection release procedure in accordance with an exemplary embodiment of the present invention. Unnecessary signaling may be prevented when user equipment generates uplink data traffic during the RRC connection release procedure.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A system for releasing a radio resource control (RRC) connection, the system comprising:
user equipment configured to transmit a RRC connection release indication when a timer expires in at least one of a Cell_paging channel (Cell_PCH) state and a universal mobile telecommunications system terrestrial radio access network registration area_paging channel (URA_PCH) state and release the RRC connection upon receiving a RRC connection release message; and a radio network controller configured to receive the RRC connection release indication from the user equipment and transmit the RRC connection release message in response to the RRC connection release indication.

2. The system of claim 1, wherein the user equipment is further configured to initiate a Cell update procedure when the timer expires and to transmit a Cell update message having the RRC connection release indication to the radio network controller.

3. The system of claim 2, wherein the user equipment transmits the Cell update message based on a cause event, the cause event at least one of cell reselection, periodical cell update, uplink data transmission, paging response, reentered service area, radio link failure, RLC unrecoverable error, and RRC connection release indication.

4. The system of claim 2, wherein a Cell update cause event includes the RRC connection release indication.

5. The system of claim 1, wherein the radio network controller is configured to set up a value of the timer and transmit the value of the timer to the user equipment.

6. The system of claim 5, wherein to set up the value of the timer, the radio network controller employs a communication environment and data traffic pattern of the user equipment.

7. The system of claim 5, wherein the radio network controller includes within a system information block (SIB) parameter the value of the timer and transmits the SIB parameter to the user equipment.

8. The system of claim 7, wherein the user equipment is configured to:
  receive the SIB parameter from the radio network controller;
  set a timer of the user equipment based the value of the timer of the SIB parameter; and
  initiate the RRC connection release procedure when the timer expires.

9. The system of claim 5, wherein a value of the timer of the user equipment indicates a time for the user equipment to transition from i) one of a Cell_PCH state and a URA_PCH state to ii) the idle mode.

10. The system of claim 1, wherein the radio network controller includes:
  a parameter setup unit configured to set up a system information block (SIB) parameter to include a value of the timer and transmit the SIB parameter to the user equipment.

11. A method of releasing a radio resource control (RRC) connection, the method comprising:
  transmitting, by user equipment, a RRC connection release indication to a radio network controller when a timer expires in at least one of a Cell_paging channel (Cell_PCH) state and a universal mobile telecommunications system terrestrial radio access network registration area_paging channel (URA_PCH) state;
  releasing the RRC connection to the radio network controller upon receiving a RRC connection release message from the radio network controller; and
  transitioning from the connected mode to an idle mode.

12. The method of claim 11, wherein the transmitting the RRC connection release indication includes:
  initiating a Cell update procedure when the timer expires; and
  transmitting a Cell update message having the RRC connection release indication to the radio network controller.

13. The method of claim 12, wherein the user equipment transmits the Cell update message based on a cause event, the cause event at least one of cell reselection, periodical cell update, uplink data transmission, paging response, reentered service area, radio link failure, RLC unrecoverable error, and the RRC connection release indication.

14. The method of claim 12, wherein a Cell update cause event includes the RRC connection release indication.

15. A method of a radio network controller for releasing a radio resource control (RRC) connection, the method comprising:
  receiving a Cell update message including a RRC connection release indication from user equipment, where the RRC connection release indication is transmitted from the user equipment when a timer of the user equipments expires and the user equipment is in at least one of a Cell_paging channel (Cell_PCH) state and a universal mobile telecommunications system terrestrial radio access network registration area_paging channel (URA_PCH) state;
  initiating a RRC connection release procedure for releasing the RRC connection between the user equipment and the radio network controller; and
  transmitting a RRC connection release message to the user equipment in response to the Cell update message.

16. The method of claim 15, prior to the receiving the Cell update message, comprising:
  setting a timer value based on a communication environment and a data traffic pattern of the user equipment; and
  transmitting the timer value to the user equipment,
  wherein the user equipment sets up the timer based on the timer value and transmits the Cell update message including the RRC connection release indication when the timer expires and the user equipment is in at least one of a Cell_PCH state and a URA_PCH state.

17. The method of claim 16, wherein the setting the timer value includes:
  setting a system information block (SIB) parameter so as to include the timer value; and
  transmitting the SIB parameter to the user equipment.

* * * * *